(12) United States Patent
Meeussen et al.

(10) Patent No.: US 12,302,805 B2
(45) Date of Patent: May 20, 2025

(54) GROW METHOD AND SYSTEM (71) Applicant: Hippo Harvest Inc., San Francisco, CA (US)

(72) Inventors: Wim Meeussen, Redwood City, CA (US); Eitan Marder-Eppstein, San Francisco, CA (US); Alexander Boenig, San Mateo, CA (US)

(73) Assignee: HIPPO HARVEST INC., San Francisco, CA (US)

( * ) Notice: Subject to any disclaimer, the term of this patent is extended or adjusted under 35 U.S.C. 154(b) by 0 days.

(21) Appl. No.: 17/182,214

(22) Filed: Feb. 22, 2021

(65) Prior Publication Data

US 2021/0259173 A1  Aug. 26, 2021

Related U.S. Application Data

(60) Provisional application No. 62/979,364, filed on Feb. 20, 2020.

(51) Int. Cl.
*A01G 31/02* (2006.01)
(52) U.S. Cl.
CPC .................. *A01G 31/02* (2013.01)
(58) Field of Classification Search
CPC .. A01G 31/02; A01G 2031/006; A01G 31/06; A01G 31/00
See application file for complete search history.

(56) References Cited

U.S. PATENT DOCUMENTS

| | | | | |
|---|---|---|---|---|
| 5,212,904 | A * | 5/1993 | Green | A01G 29/00 47/48.5 |
| 6,233,870 | B1 * | 5/2001 | Horibata | A01G 31/02 47/62 N |
| 10,004,187 | B1 * | 6/2018 | Van Wingerden | A01G 31/042 |
| 11,083,126 | B2 * | 8/2021 | Richman | A01G 31/00 |
| 11,457,578 | B2 | 10/2022 | Marder-Eppstein et al. | |
| 2012/0297675 | A1 * | 11/2012 | Hashimoto | A01G 27/02 47/64 |
| 2018/0365137 | A1 | 12/2018 | Millar | |
| 2018/0368344 | A1 | 12/2018 | Marshall | |
| 2019/0045731 | A1 | 2/2019 | Dixon et al. | |
| 2019/0281778 | A1 | 9/2019 | Hawley-Weld et al. | |
| 2020/0236878 | A1 | 7/2020 | Millar et al. | |
| 2021/0007307 | A1 | 1/2021 | Adams et al. | |
| 2021/0059140 | A1 * | 3/2021 | McHenry, III | A01G 31/06 |
| 2021/0127594 | A1 | 5/2021 | Millar | |

(Continued)

FOREIGN PATENT DOCUMENTS

| | | | | |
|---|---|---|---|---|
| CA | 2385896 | A1 * | 3/2007 | A01G 31/02 |
| CN | 108496654 | A | 9/2018 | |

(Continued)

OTHER PUBLICATIONS

U.S. Appl. No. 17/182,222, Non-Final Office Action mailed May 10, 2021, 8 pgs.

(Continued)

*Primary Examiner* — Morgan T Jordan
*Assistant Examiner* — Carly W. Lynch (57) ABSTRACT

A hydroponic grow system and grow method. The system includes growing plants in grow modules that are individually moveable. The plants grow in trays where roots never touch the water supply.

20 Claims, 5 Drawing Sheets

(56) References Cited

U.S. PATENT DOCUMENTS

| | | |
|---|---|---|
| 2021/0137028 A1 | 5/2021 | Zelkind et al. |
| 2021/0259160 A1 | 8/2021 | Marder-Eppstein et al. |
| 2021/0259163 A1 | 8/2021 | Marder-Eppstein et al. |
| 2021/0259170 A1 | 8/2021 | Marder-Eppstein et al. |
| 2021/0259172 A1 | 8/2021 | Meeussen et al. |
| 2023/0028722 A1 | 1/2023 | Marder-Eppstein et al. |
| 2023/0082515 A1 | 3/2023 | Schoen |

FOREIGN PATENT DOCUMENTS

| | | | | |
|---|---|---|---|---|
| CN | 110679340 A | * | 1/2020 | ........... A01G 9/0295 |
| EP | 0268556 B1 | * | 12/1991 | ............. A01G 31/02 |
| EP | 2028160 A2 | * | 2/2009 | ................ C02F 3/32 |
| EP | 3476211 A2 | | 5/2019 | |
| EP | 217563980 | | 8/2022 | |
| JP | S62181149 U | * | 11/1987 | ............. A01G 31/00 |
| JP | 6612536 B2 | * | 11/2019 | ............. A01G 31/00 |
| WO | WO-2017098776 A1 | * | 6/2017 | ............. A01G 22/00 |
| WO | WO-2019074549 A1 | * | 4/2019 | ............. A01G 31/06 |
| WO | WO-2019222860 A1 | * | 11/2019 | ............... A01G 9/26 |
| WO | WO2021168459 | | 2/2021 | |
| WO | 2021168459 A1 | | 8/2021 | |

OTHER PUBLICATIONS

U.S. Appl. No. 17/182,222, Examiner Interview Summary mailed Jun. 24, 2021, 2 pgs.
Int'l Application Serial No. PCT/US21/19130, Int'l Search Report and Written Opinion mailed Jun. 9, 2021.
U.S. Appl. No. 17/938,032, USPTO e-Office Action: CTNF—Non-Final Rejection, Jan. 18, 2023, 4 pages.
U.S. Appl. No. 17/182,222, Advisory Action mailed Oct. 22, 2021, 3 pgs.
U.S. Appl. No. 17/182,222, Examiner Interview Summary mailed Feb. 2, 2022, 2 pgs.
U.S. Appl. No. 17/182,222, Final Office Action mailed, Sep. 14, 2021, 8 pgs.
U.S. Appl. No. 17/182,222, Non-Final Office Action mailed Jan. 5, 2022, 8 pgs.
U.S. Appl. No. 17/182,222, Notice of Allowance mailed Jun. 2, 2022, 5 pgs.

* cited by examiner

GROW METHOD AND SYSTEM

CROSS-REFERENCE TO RELATED APPLICATIONS

This application claims priority to Provisional U.S. Patent Application No. 62/979,364, titled "Growspace Operating System," filed on Feb. 20, 2020, by Eitan Marder-Eppstein et al., which is incorporated herein by reference in its entirety and for all purposes.

TECHNICAL FIELD

The present disclosure relates generally to agriculture, and more specifically to hydroponic farming systems.

DESCRIPTION OF RELATED ART

Agriculture has been a staple for mankind, dating back to as early as 10,000 B.C. Through the centuries, farming has slowly but steadily evolved to become more efficient. Traditionally, farming occurred outdoors in soil. However, such traditional farming required vast amounts of space and results were often heavily dependent upon weather. With the introduction of greenhouses, crops became somewhat shielded from the outside elements, but crops grown in the ground still required a vast amount of space. In addition, ground farming required farmers to traverse the vast amount of space in order to provide care to all the crops. Further, when growing in soil, a farmer needs to be very experienced to know exactly how much water to feed the plant. Too much and the plant will be unable to access oxygen; too little and the plant will lose the ability to transport nutrients, which are typically moved into the roots while in solution.

Two of the most common errors when growing are overwatering and underwatering. With the introduction of hydroponics, the two most common errors are eliminated. Hydroponics prevents underwatering from occurring by making large amounts of water available to the plant. Hydroponics prevents overwatering by draining away, recirculating, or actively aerating any unused water, thus, eliminating anoxic conditions.

Operating a hydroponic growspace today comes with a number of challenges that place significant burdens on farmers and leads to increased costs and/or inefficient food production. For example, current hydroponic systems have high manual labor costs for maintenance of crops. If farmers want to reduce labor costs, they can purchase traditional manufacturing equipment, which is very expensive. In addition, current hydroponic systems produce a lot of waste and have pest management problems. Last, current hydroponic systems do not have the ability to easily evolve because obtaining granular data can be taxing on farmers.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a system. The system comprises a grow module. The grow module includes a growing tray, a nutrient water source, a buffer mat, a membrane, a top cover, a separation mechanism configured to provide an air gap between the top cover and the membrane, and a grow medium.

Another aspect of the present disclosure relates to a method for growing plants in a hydroponic system. The method comprises growing plants in a grow module. The grow module includes a growing tray, a nutrient water source, a buffer mat, a membrane, a top cover, a separation mechanism configured to provide an air gap between the top cover and the membrane, and a grow medium In some embodiments, the buffer mat includes a wicking mechanism configured to ensure all areas of the membrane are in contact with nutrient water without needing to keep the growing tray level. In some embodiments, the nutrient water source includes a plumbing connection with an overflow prevention mechanism overflow prevention mechanism, the overflow prevention mechanism including an outflow channel positioned precisely at a desired nutrient water level line on the growing tray to prevent nutrient water from rising above the desired nutrient water level line. In some embodiments, the buffer mat directly or indirectly floats on top of the nutrient water source. In some embodiments, the nutrient water source is configured to automatically refill the grow tray with the same amount of nutrient water that is used by plants. In some embodiments, the spacer frame includes air gaps to allow fresh air to come into contact with a thin layer of water that covers plant roots, resulting in maximum oxygen absorption due to a high surface area to volume ratio. In some embodiments, the grow module is configured to keep the nutrient water located in the grow tray always pristine without the need for fast flow rates. In some embodiments, the top cover physically supports plants and prevents the plants from tipping over. In some embodiments, the top cover is made of a material that blocks sunlight from penetrating through and wherein the top cover has a thickness that prevents light from penetrating through the plant holes at angles other than 90 degrees with the plane of the top cover. In some embodiments, the grow module further comprises a vertical overflow prevention mechanism comprising flow cutouts to prevent clogging of the vertical overflow prevention mechanism.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, portions of the techniques of the present disclosure will be described in the context of particular hydroponic grow systems. However, it should be noted that the techniques of the present disclosure apply to a wide variety of different grow systems. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a growing tray in a variety of contexts. However, it will be appreciated that a system can use multiple growing trays while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, plant roots may be connected to nutrient water, but it will be appreciated that a variety of layers, such as grow mediums and buffer mats, may reside between the plant roots and nutrient water. Consequently, a connection does not necessarily mean a direct, unimpeded connection unless otherwise noted.

Example Embodiments

As mentioned above, current hydroponic systems have many drawbacks. For example, current hydroponic growing methods are inflexible and tightly coupled to the greenhouse infrastructure. Plants either sit stationary for the duration of their growth cycle or are transported in linear fashion on long conveyors with no ability to access plants anywhere but the beginning or end of a run. This limits current operators from changing the grow climate during different stages of a crop's production, from treating pests in a more targeted/direct fashion at the per plant level instead of spraying, and from leveraging capitally expensive fixed infrastructure (e.g. LED grow lights) as effectively as possible.

Another problem is that current hydroponic growing methods suffer from continuously degrading nutrient levels in the water, because plants take up nutrients as they grow. This creates two problems: (i) nutrient levels need to be continuously monitored and resupplied, and (ii) after some period of time water needs to get dumped and/or filtered with a reverse osmosis (RO) filter, both of which result in significant waste water. Recirculating hydroponic systems become unbalanced in their nutrient composition as plants take up more of some elements (e.g. Nitrogen, Potassium, Calcium, etc.) vs others. In addition, current hydroponic systems have salts build up in them over time that must be managed. As this happens, farmers must remove salts from the system in order to maintain balance which they often do through reverse osmosis filtration. As part of this, water with high salinity is dumped as a bi-product of reverse osmosis which can be harmful to the local watershed.

Yet another drawback is that current hydroponic growing methods operate with lower than desired oxygen saturation levels in the water supply and often use active aeration via air-stones, spray nozzles, high flow rates, or other methods to provide water rich in oxygen to plants.

Yet another drawback is the management and suppression of pests and disease. Managing pests is a large part of running a growspace where preventative measures are always best. In addition, immediate reaction and response times can often be crucial. Rodents, aphids, mites, molds, etc. can present major problems in growspace settings if they cannot be kept in check. In addition, recirculating water systems are an easy mode of transmission for disease, which can spread extremely quickly in these environments. Growspaces (and hydroponic operations generally, including warehouse systems) are constantly concerned with pathogens in their water supply because entire crops can be lost to disease because many current systems use grow tubs that sit on the ground, making them easy targets for these types of pests.

Last, one other major drawback with current hydroponic systems is the inability to support diversification. Growspaces that have automation built into them are only capable of growing a small set of crops (often just one) that are aligned with the tooling they have. If a growspace growing lettuce loses a major customer, but finds a replacement that wants tomatoes instead, there is no easy way to switch. The cost of retooling and effort of reconfiguring a growspace prevents growers from making that kind of change. In addition, farmers cannot grow multiple crops or change what they grow based on the time of year or market patterns without changing automation systems. (e.g. Farmers cannot ramp up tomato production in the winter, but then swap it out for lettuce in the summer as field tomatoes flood the market).

The systems and techniques disclosed herein may help to address the above mentioned issues by providing a novel grow system that can be vertically integrated with a low flow plumbing system, robotic transport, centralized processing of produce, and scheduling/monitoring/tracking software. In addition, the systems and techniques disclosed herein provide many advantages over current hydroponic systems. According to various embodiments, the commercial grow methods and systems presented herein provide flexible systems for plant growth where plants can be accessed randomly, moved to different locations/climates within the grow space, and easily taken in and out of fixed infrastructure like plumbing. According to various embodiments, the commercial growing methods and systems presented herein provide a one-way nutrient supply to plants in parallel, resulting strong guarantees about water composition/quality in its recirculating system. This simplifies nutrient management and avoids the need for dumping and/or filtering of water. According to various embodiments, the commercial growing methods and systems presented herein always provide maximum oxygen saturation in the water. At the same time, the growing methods and systems provided herein avoid the need for active aeration while still providing plants with oxygen rich water. This means the disclosed methods and systems have higher dissolved oxygen content in the water at the root zone, promoting better plant growth, given the high volume to surface area ratio for water as compared to grow tubs. In some embodiments, the grow modules disclosed are built on tables that are lifted off the ground, with cones on the legs to protect against rodents.

The systems and techniques disclosed herein provide many advantages over current hydroponic systems on a more macro level as well. For example, in some embodiments, the disclosed automation systems are modular, requiring less up-front capital investment and allowing for gradual expansion of a grow operation. In some embodiments, the automation systems disclosed are decoupled from the crops being grown, which means that the techniques and systems work across many different crop types (e.g. lettuce, tomatoes, strawberries, etc.). In some embodiments, the grow systems are easily integrated into a mobile system, e.g., having supporting structures and lift alignments to allow automated transport using mobile robots instead of conveyors, which eliminates the need for reconfiguring conveyors. In some embodiments, the grow system uses growing trays that allow for random access to plants. By contrast, current conveyor and raft systems only allow farmers to access plants that are at the beginning or end of the conveyor or raft system. In such current systems, if anything happens (e.g., disease) to plants in the middle, it is very difficult for growers to take action or even identify that the problem exists using traditional automation processes.

According to various embodiments, the grow systems comprise a number of distinct components/modules/subsystems that operate together. However, it should be noted that techniques of the present disclosure do not require all components/modules/subsystems described. For example, in some embodiments, a grow system according to the present disclosure can include a single component or subsystem or any combination of the different components and subsystems described herein. The different components/modules/subsystems are described in detail below.

Figure 1:
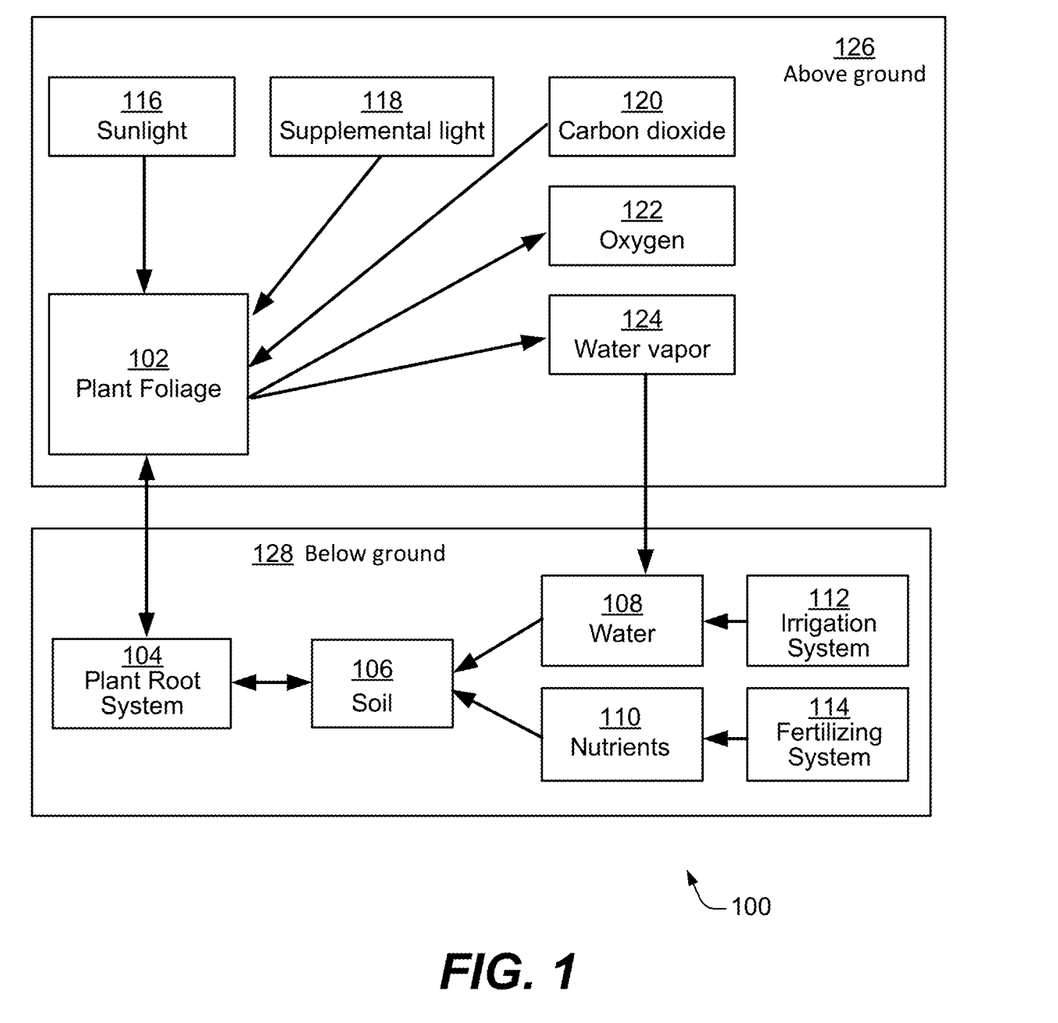
FIG. 1 illustrates a simple diagram showing one example of a typical plant growing cycle, in accordance with embodiments of the present disclosure.

FIG. 1 illustrates a simple diagram showing one example of a typical plant growing cycle, in accordance with embodiments of the present disclosure. In FIG. 1, a typical plant growing cycle 100 includes a plant root system 104 that is anchored in soil 106 to provide stability to plant foliage 102. Plant root system 104 absorbs both water 108 and nutrients 110 from soil 106, and disposes of any plant waste products into soil 106. Water 108 is provided by precipitation from the atmosphere, by an irrigation system 112, or by a combination of both. Nutrients 110 can be present in soil 106, or be added by a fertilizing system 114. Plant foliage 102 absorbs carbon dioxide 120 from the atmosphere, which is either naturally present or artificially added, and releases oxygen 122 into the atmosphere. In addition, plant foliage 102 evaporates water 108 into the atmosphere. The main energy source for plants is either sunlight 116, supplemental light 118, or a combination of both. Plant root system 104, soil 106, water 108, nutrients 110, irrigation system 112, and fertigation system 114 typically occur below ground 128. Plant foliage 102, sunlight 116, supplemental light 118, carbon dioxide 120, oxygen 122, and water vapor 124 are typically present above ground 126.

According to various embodiments, the commercial growing method described herein is hydroponic. In some embodiments, there is no soil in the system and plants receive sustenance from nutrient rich water that is delivered to their roots via the low flow plumbing system. In some embodiments, plants are grown together in individual grow modules that are replicated across the farm and operate on the principles described herein.

Figure 2:
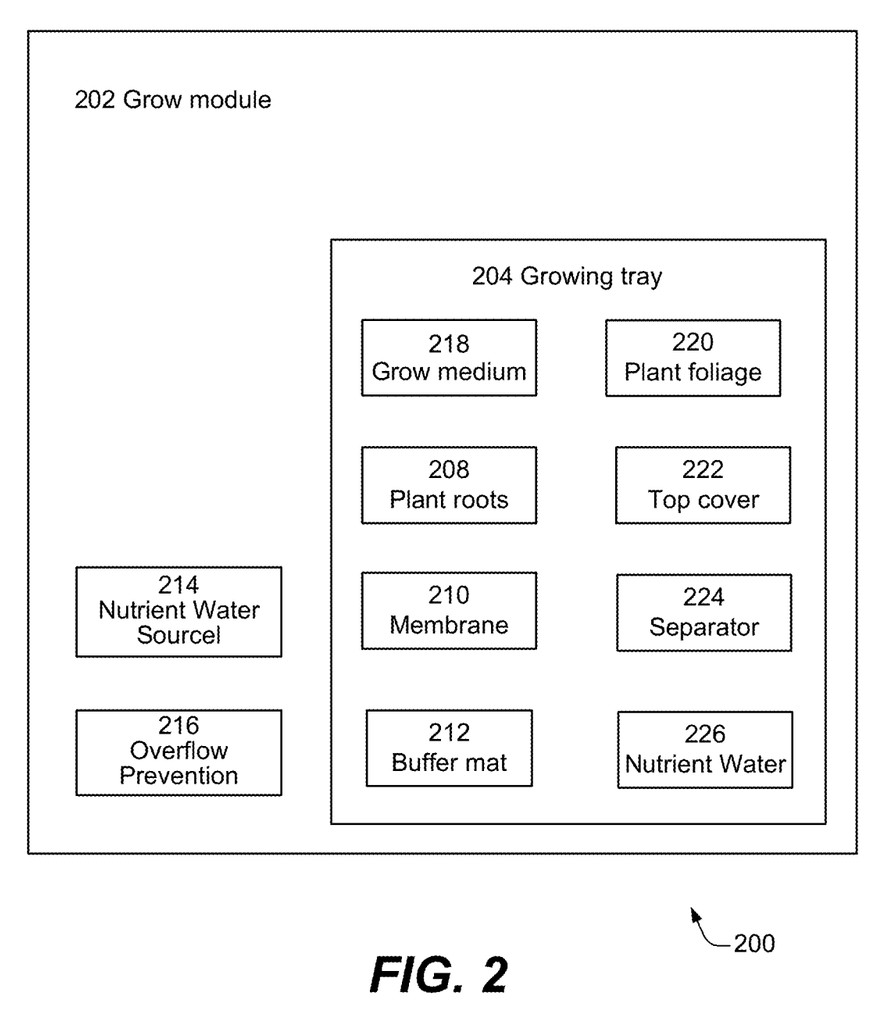
FIG. 2 illustrates a block diagram showing one example of a commercial grow system, in accordance with embodiments of the present disclosure.

FIG. 2 illustrates a block diagram showing one example of a commercial grow system, in accordance with embodiments of the present disclosure. Grow system 200 includes one or more grow modules 202. Each grow module 202 comprises a growing tray (or grow tray) 204, which contains a buffer mat 212, a membrane 210, a top cover 222, separator 224, nutrient water 226, grow medium 218, plant foliage 220, and plant roots 208. Growing tray 204 is connected to a water inflow channel 214 and/or an overflow prevention system 216. In some embodiments, grow medium 218, such as a grow plug, provides the structure for both the plant roots 208 and the plant foliage 220. There are also multiple configurations of these components that can be used in production systems where the water inflow channel 214 and water outflow channel 214 placement can adjust based on the needs of a broader plumbing system, or be removed entirely to reduce overall system maintenance and complexity.

Figure 3:
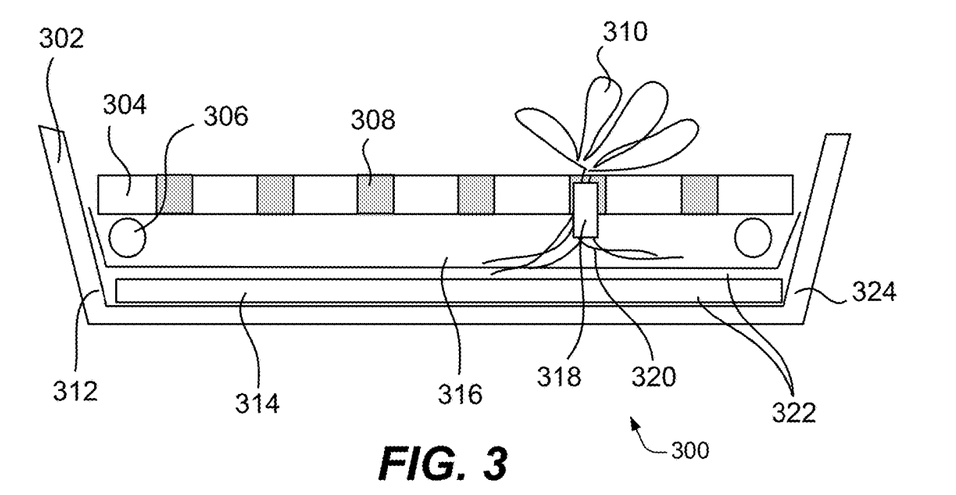
FIG. 3 illustrates an example of a grow module, in accordance with embodiments of the present disclosure.

A specific implementation of grow system 200 described above is shown in FIG. 3. FIG. 3 illustrates an example of a grow module 300, in accordance with embodiments of the present disclosure. Current hydroponic growing methods suffer from continuously degrading nutrient levels in the water, because plants take up nutrients as they grow. This creates two problems: (i) nutrient levels need to be continuously monitored and resupplied, and (ii) nutrient water needs to continuously flow at a high rate to achieve similar nutrient levels for all plants. The commercial growing method presented herein addresses this problem by supplying a parallel nutrient water supply to all plants, which provides strong guarantees about nutrient composition/quality throughout the system, and which allows decreasing water flow to a slow dripping rate. The parallel nutrient water delivery 322 is achieved through a horizontal movement of nutrient water 322 through buffer mat 314, which is underneath plant roots 320. During this horizontal flow, plant roots 320 do not touch nutrient water 322, allowing it to stay pristine. After the horizontal movement, nutrient water 322 will move up vertically to membrane 316 and plant roots 320. The vertical movement will give each plant in the system its own supply of nutrient water 322, untouched by other plants in the system. The vertical flow also ensures that nutrient water 322 that has come in contact with plant roots 320, will not flow back to buffer mat 314, since it cannot fight the vertical flow of nutrient water 322. The result is that the composition of nutrient water 322 at buffer mat 314 level remains pristine, eliminating the need for fast flow rates and eliminating the need for continuous management of nutrient water 322 composition.

The example method described below addresses the problem of continuously degrading nutrient levels in the nutrient water, the need to continuously monitor and resupply nutrients, the need to dump nutrient water, and the need to filter water with a reverse osmosis (RO) filter. According to various embodiments, the root cause of degrading nutrient levels is the direct contact between plant roots 320 and nutrient water 322. This causes the nutrient levels to become sub-optimal, and causes some elements to build up to higher and higher concentrations in the water, requiring either a water discharge or requiring expensive filtering.

According to various embodiments, plant growth is accelerated by providing plant roots 320 directly with the optimal mixture of nutrients and water, such that the plant never lacks any nutrients, and so the plant needs to spend less energy on root growth as compared to plant growth in traditional soil. To achieve this, a pre-mixed solution of nutrient water 322 is provided to plant roots 320 by a water and nutrient flow through inflow channel 312 into growing tray 302, through buffer mat 314, through membrane 316, and to plant roots 320. It is critical in this system that any nutrient water 322 that comes in contact with plant roots 320 cannot flow back out of growing tray 302, because once plant roots 320 touch the nutrient water, the levels of nutrients in the water are altered, and the nutrient mixture is not optimal anymore.

In some embodiments, the example method described in this section addresses the problem of low dissolved oxygen levels in water, without the need for active aeration systems or precise leveling of grow systems. Reaching saturation levels of oxygen is especially important in warm conditions, when plants need additional oxygen to support their accelerated metabolism. At the same time, warmer water is not able to dissolve as much oxygen as colder water, causing plant stress and reducing growth and resilience to warm weather. In some embodiments, the example growing methods described herein are able to reach saturation levels of oxygen in the water at all times, by creating a large surface area to total volume ratio between nutrient water 322 and the surrounding air. In some embodiments, this is achieved by using a separation mechanism, or separator, such as spacer frame 306, that keeps top cover 304 suspended above membrane 316, ensuring that there is an air-gap between membrane 316 and top cover 304. Spacer frame 306 achieves this by forming a physical barrier between membrane 316 and top cover 304. Spacer frame 306 sits on top of membrane 316, and top cover 304 sits on top of spacer frame 306. Spacer frame 306 only contacts membrane 316 at the outer edges, leaving as much surface as possible open for plant roots 320. In this air gap created by spacer frame 306, plant roots 320 have space to grow, and fresh air coming through plant holes 308 in top cover 304 can reach all plant roots 320 and supply the maximum oxygen for plant growth. The transfer of oxygen to nutrient water 322 is enabled by a very large surface of shallow water that sits in contact with air in plant roots 320 zone. Because membrane 316 prevents plant roots 320 from growing down into nutrient water 322, buffer mat 314 provides nutrient water 322 even in non-level conditions through capillary action, and water outflow channel 324 prevents the water level from rising. Thus, plant roots 320 are not submerged in water, but merely coated in a thin layer of water, thereby creating a large surface area to absorb oxygen from the air.

It is important for plants in hydroponics systems to be physically supported, since plant roots 320 cannot provide the same level of support as for plants grown in soil. Often this is achieved by adding net pots or other additional components to the grow system. However, every component added increases the cost and complexity of the system, and increases maintenance and cleaning overhead. In some embodiments, example grow methods described herein achieves full plant support through a specific organization of the existing module components. Top cover 304, spacer frame 306 and membrane 316 together hold the plant in place throughout the growth cycle and during transport. Top cover 304 makes contact with grow plug 318, because plant holes 308 are only slightly larger than grow plug 318. This contact with top cover 304 provides lateral support to grow plug 318, preventing the plants from sliding sideways. In addition, because spacer frame 306 raises the height of top cover 304, top cover 304 contacts grow plug 318 at a higher point, preventing the plant from tipping over. The weight of the plant is supported by membrane 316, because grow plug 318 sits directly on top of membrane 316. This setup also reduces the cost of transplanting the plants into the system at the start of the grow cycle, because the grow plug of each plant can be directly dropped into a hole of top cover 304, without having to first assemble a grow plug and net pot. This saves both on materials and labor for transplanting at the start of the growing cycle. In addition, this design also makes composting grow plugs 318 easier at the end of the grow cycle, because they can simply be lifted out of plant holes 308 in top cover 304, without having to remove the non-compostable net pot.

According to various embodiments, nutrient water 322 contains all nutrients to allow plants to grow, but other undesirable organisms such as algae can also grow in the same nutrient water. Therefore, in some embodiments, it is important to block sunlight as much as possible from directly reaching nutrient water 322. In some embodiments, top cover 304 blocks sunlight from directly reaching membrane 316. To achieve this, top cover 304 is built out of a fully non-transparent material that blocks all visible, infrared and ultraviolet light. The area of top cover 304 is almost identical to the area of growing tray 302, ensuring that the full surface of growing tray 302 is covered. Small alignment gaps between growing tray 302 and top cover 304 are sealed by the edges of membrane 316, because the edges of membrane 316 get trapped in between the edges of growing tray 302 and the edges of top cover 304, thereby creating a light blocking seal on the edges of top cover 304. In some embodiments, to prevent light from reaching membrane 316 near plant holes 308 in top cover 304, top cover 304 has a sufficient thickness, which only leaves a small vertical shaft open between top cover 304 and the grow plugs 318, preventing all light that does not hit the grow tray at a fully vertical angle from reaching membrane 316 below top cover 304.

The techniques and mechanisms described herein rely on grow tray 302 to be leveled very accurately, to ensure that all areas of membrane 316 are in contact with nutrient water 322, while also making sure that no nutrient water 322 is pooling on top of membrane 316. In some embodiments, to avoid having to level grow trays 302 accurately, a special version of buffer mat 314 with water wicking properties through capillary action is used, in combination with a lower overall water level in grow tray 302. In areas where the water level is below membrane 316, which would normally leave membrane 316 dry, the wicking property of buffer mat 314 will move nutrient water 322 upwards to the top of buffer mat 314, making contact with membrane 316 and making membrane 316 wet. In areas where the mis-leveling of grow tray 302 would normally create pooling of nutrient water 322 on top of membrane 316, the lower overall nutrient water 322 level in grow tray 302 prevents the pooling.

Figure 4:
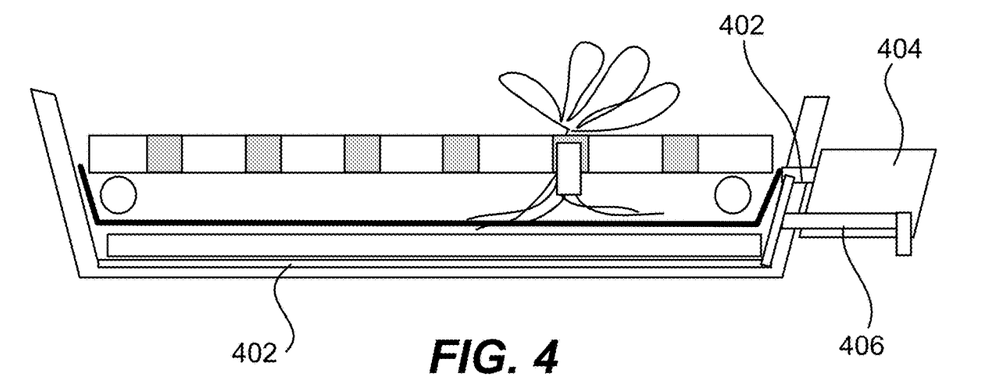
FIG. 4 illustrates an example of a grow module with a plumbing connection and a horizontal outflow channel, in accordance with embodiments of the present disclosure.
Figure 5:
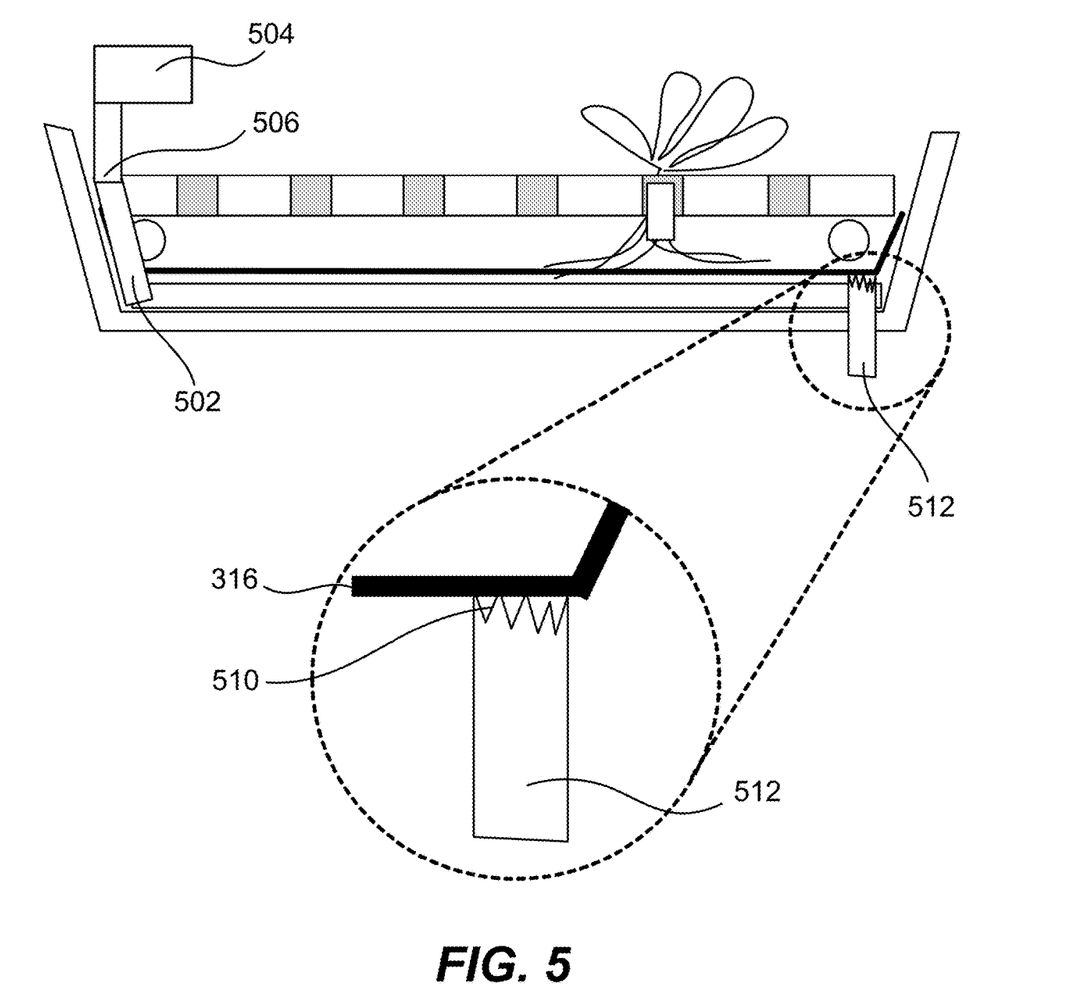
FIG. 5 illustrates an example of a grow module with a plumbing connection and a vertical outflow channel, in accordance with embodiments of the present disclosure.

FIGS. 4 and 5 illustrate examples of a grow module with different plumbing connections. In some embodiments, the grow modules in FIGS. 4 and 5, which incorporate plumbing connection 404 or plumbing connection 504, respectively, allow for variable and actively controlled flow rates of nutrient water 322 into and out of growing tray 302. In these embodiments, nutrient water 322 is channeled into grow tray 302 through a plumbing connection 404 mounted on the outside of grow tray 302, or a plumbing connection 504 mounted on the inside of grow tray 302. If plumbing connection 404 is located on the same side of growing tray 302 as the outflow channel 406, an additional inflow channel 402 is added to ensure that nutrient water 322 is directed to the other side of growing tray 302 and is forced to flow throughout the entire growing tray 302 from the end of inflow channel 402 to outflow channel 406. As nutrient water 322 flows into grow tray 302, it is important that the level of nutrient water 322 remains constant. Therefore, a horizontal outflow channel 406 or vertical outflow channel 512 is added as an implementation of an overflow prevention system 324. The outflow channels work by creating a channel that allows all nutrient water 322 that reaches a level that's higher than the desired level of nutrient water 322 in grow tray 302 to drain out of grow tray 302. It is important to set the height of this outflow channel at the same level as the desired nutrient water 322 level. In FIG. 5, outflow channel 512 is located at the opposite side of where nutrient water 322 flows into grow tray 302 from plumbing connection 504, through inflow angle 506, and into inflow channel 502. Having inflow channel 502 be on the opposite side of outflow channel 512 ensures a one way flow through grow tray 302, which provides all areas of buffer mat 314 with fresh nutrient water 322. Buffer mat 314 allows the grow module to operate without new nutrient water 322 supply for long periods of time which enables grow modules to be mobile and for plumbing to turn on and off without impacting plant health. As such, the system is compatible with a wide range of plumbing (low flow, high flow, and intermittent flow) and transport systems.

According to various embodiments, issues may occur where sediment, root mass on membrane 316, or algae build up causes the system to clog and fail to drain. The vertical overflow prevention system 512 employs flow cutouts 510 in order to avoid this clogging problem. In some embodiments, flow cutouts 510 are introduced into vertical outflow channel 512 directly below membrane 316. In some embodiments, flow cutouts 510 form a set of teeth. The gaps in between the teeth allow nutrient water 322 to flow at all times, even when the top of vertical outflow channel 512 is completely blocked off by sediment or root mass on top of the membrane 316. The tips of the teeth keep membrane 316 pushed up, thereby preventing membrane 316 from blocking the gaps in between the teeth.

Figure 6:
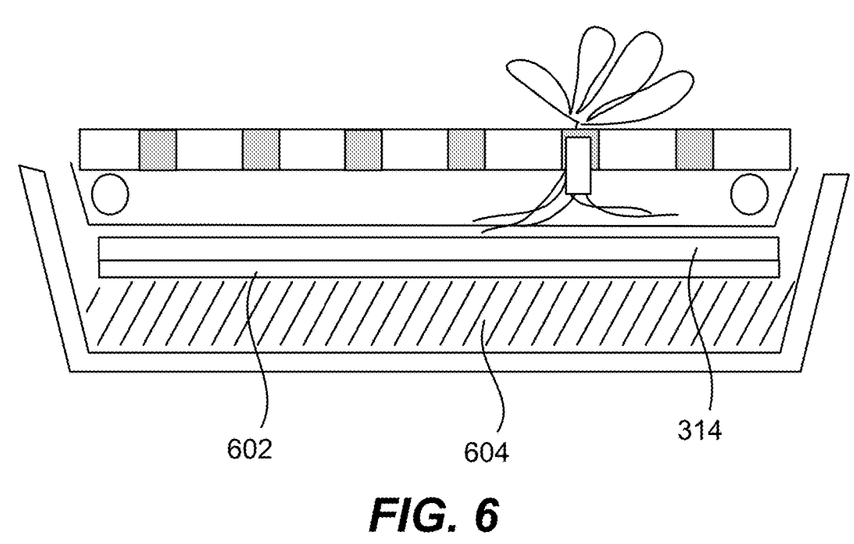
FIG. 6 illustrates an example of a grow module with a floatation layer, in accordance with embodiments of the present disclosure.

According to various embodiments, membrane grow systems use connections to plumbing to create a water flow, which is required to function properly. However, certain embodiments of the present disclosure can even operate without plumbing connections. The example membrane systems presented in FIGS. 6 and 7 can be configured to operate without a continuous flow of nutrient water 322 through grow tray 302. FIG. 6 illustrates an example of a grow module with a floatation layer 602. In FIG. 6, all nutrient water 322 needed for the plant's grow cycle is present inside nutrient solution 604, which is located inside the grow tray from the beginning of the growth cycle. In some embodiments, buffer mat 314 is made to float on top of the body of nutrient solution 604, by either constructing buffer mat 314 of a material that is lighter than water, or by adding an additional layer of material 602 that is lighter than water material underneath buffer mat 314.

Figure 7:
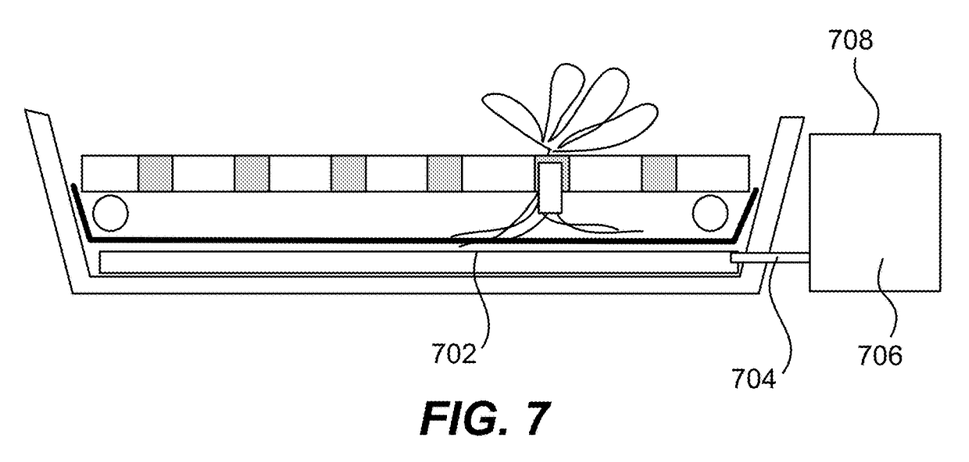
FIG. 7 illustrates an example of a grow module with an airlocked nutrient reservoir, in accordance with embodiments of the present disclosure.

FIG. 7 illustrates an example of a grow module with an airlocked nutrient reservoir 706. As shown in FIG. 7, nutrient reservoir 706 sits next to growing tray 302 and refills grow tray 302 with the same amount of nutrient water 322 as is used by the plants. This exact water flow is achieved by constructing nutrient reservoir 706 in a way that is completely air-tight (except for the inflow channel 704) and by placing an outflow channel of nutrient reservoir 706 at the exact same height as the desired nutrient solution level 702 in the grow tray 302. In some embodiments, the outflow channel is the same as the inflow channel 704. In other embodiments, the grow tray includes a separate outflow channel located at nutrient solution level 702. As long as there is sufficient nutrient water 322 in the grow tray 302, the inflow channel 704 will be submerged in nutrient water 322, which prevents air from entering the inflow channel 704, which in turn prevents nutrient water 322 from flowing out of nutrient reservoir 706. When the level of nutrient water 322 drops below the desired nutrient solution level 702, air will enter inflow channel 704, allowing additional nutrient water 322 to flow from nutrient reservoir 706 into grow tray 302, until nutrient solution level 702 is back at its desired level.

In the foregoing specification, the present disclosure has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

What is claimed is:

1. A system comprising:
   a grow module that includes:
   a growing tray;
   a membrane;
   a top cover through which oxygen reaches plant roots of a plurality of plants, wherein the top cover comprises a non-transparent material, wherein edges of the membrane create a light blocking seal on edges of the top cover, and wherein the top cover forms vertical shaft openings of a thickness that prevent light from reaching the membrane but through which oxygen reaches the plant roots;
   a separator that contacts the membrane at one or more outer edges of the membrane, separating the top cover and the membrane causing fresh air to contact a layer of water that covers the plant roots; and
   wherein the growing tray allows a flow of a nutrient water supply
   wherein the plant roots are prevented from growing down into the flow of the nutrient water supply.

2. The system of claim 1, wherein the growing tray includes a buffer mat that includes a wicking mechanism configured to ensure all areas of the membrane are in contact with nutrient water without needing to keep the growing tray level.

3. The system of claim 2, wherein the buffer mat directly or indirectly floats on top of the nutrient water supply.

4. The system of claim 1, wherein the growing tray includes an outflow channel positioned precisely at a desired nutrient water level line on the growing tray to prevent nutrient water from rising above the desired nutrient water level line.

5. The system of claim 1, wherein the nutrient water supply is configured to automatically refill the growing tray with the same amount of nutrient water that is used by plants.

6. The system of claim 1, wherein a water level of the flow of the nutrient water supply is maintained under a predetermined threshold in order to prevent pooling of water at the top of the membrane.

7. The system of claim 1, wherein the grow module is configured to keep the nutrient water located in the growing tray always uncontaminated.

8. The system of claim 1, wherein the top cover physically supports plants and prevents the plants from tipping over.

9. The system of claim 1, wherein the top cover is made of a material that blocks sunlight from penetrating through and wherein the top cover has a thickness that prevents light from penetrating through plant holes at angles other than 90 degrees with a plane of the top cover.

10. The system of claim 1, wherein the grow module further comprises a vertical overflow prevention mechanism comprising flow cutouts to prevent clogging of the vertical overflow prevention mechanism.

11. A method for growing plants in a hydroponic system, the method comprising:
   growing plants in a grow module that includes:
   a growing tray;
   a membrane;
   a top cover through which oxygen reaches plant roots of a plurality of plants, wherein the top cover comprises a non-transparent material, wherein edges of the membrane create a light blocking seal on edges of the top cover, and wherein the top cover forms vertical shaft openings of a thickness that prevent light from reaching the membrane but through which oxygen reaches the plant roots;
   a separator that contacts the membrane at one or more outer edges of the membrane, separating the top cover and the membrane causing fresh air to contact a layer of water that covers the plant roots; and
   wherein the growing tray allows a flow of a nutrient water supply
   wherein the plant roots are prevented from growing down into the flow of the nutrient water supply.

12. The method of claim 11, wherein the growing tray includes a buffer mat that includes a wicking mechanism configured to ensure all areas of the membrane are in contact with nutrient water without needing to keep the growing tray level.

13. The method of claim 12, wherein the buffer mat directly or indirectly floats on top of the nutrient water supply.

14. The method of claim 11, wherein the growing tray includes an outflow channel positioned precisely at a desired nutrient water level line on the growing tray to prevent nutrient water from rising above the desired nutrient water level line.

15. The method of claim 11, wherein the nutrient water supply is configured to automatically refill the growing tray with the same amount of nutrient water that is used by plants.

16. The method of claim 11, wherein a water level of the flow of the nutrient water supply is maintained under a predetermined threshold in order to prevent pooling of water at the top of the membrane.

17. The method of claim 11, wherein the grow module is configured to keep the nutrient water located in the growing tray always uncontaminated.

18. The method of claim 11, wherein the top cover physically supports plants and prevents the plants from tipping over.

19. The method of claim 11, wherein the top cover is made of a material that blocks sunlight from penetrating through and wherein the top cover has a thickness that prevents light from penetrating through plant holes at angles other than 90 degrees with a plane of the top cover.

20. The method of claim 11, wherein the grow module further comprises a vertical overflow prevention mechanism comprising flow cutouts to prevent clogging of the vertical overflow prevention mechanism.

* * * * *